United States Patent
Igarashi et al.

(10) Patent No.: US 6,510,735 B2
(45) Date of Patent: Jan. 28, 2003

(54) CHARACTERISTICS ADJUSTING MEANS OF PHYSICAL QUANTITY SENSING DEVICE AND THERMAL TYPE AIR FLOW MEASURING INSTRUMENT

(75) Inventors: Shinya Igarashi, Naka-machi (JP); Kaoru Uchiyama, Omiya-machi (JP); Hitoshi Ishikawa, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/867,665

(22) Filed: May 31, 2001

(65) Prior Publication Data
US 2001/0027683 A1 Oct. 11, 2001

Related U.S. Application Data

(63) Continuation of application No. 09/524,763, filed on Mar. 13, 2000, and a continuation of application No. 08/900,517, filed on Jul. 25, 1997, now Pat. No. 6,070,462.

(30) Foreign Application Priority Data

Jul. 25, 1996 (JP) .............................................. 8-195973

(51) Int. Cl.$^7$ ................................................ G01F 1/68
(52) U.S. Cl. ................................................ 73/204.22
(58) Field of Search ........................ 73/204.22, 861.25, 73/861.21, 861.26, 755; 250/221

(56) References Cited

U.S. PATENT DOCUMENTS

| | | | | |
|---|---|---|---|---|
| 4,106,350 A | * | 8/1978 | Morris et al. ................... | 73/755 |
| 4,304,128 A | * | 12/1981 | Hafner et al. .............. | 73/204.22 |
| 4,400,974 A | * | 8/1983 | Nishimura et al. ....... | 73/204.15 |
| 4,685,324 A | * | 8/1987 | Bourdon et al. .......... | 73/204.15 |
| 4,873,655 A | * | 10/1989 | Kondraske ................... | 73/1.88 |
| 4,884,215 A | * | 11/1989 | Zboralski et al. ........... | 73/118.2 |
| 4,918,973 A | * | 4/1990 | Kruse .......................... | 73/1.34 |
| 5,186,044 A | * | 2/1993 | Igarashi et al. ............. | 73/118.2 |
| 5,329,117 A | * | 7/1994 | Galili et al. ................. | 250/221 |
| 5,371,686 A | * | 12/1994 | Nabity et al. ............. | 73/861.25 |
| 5,509,306 A | * | 4/1996 | Yamamoto et al. ....... | 73/204.15 |
| 5,630,411 A | * | 5/1997 | Holscher ............... | 128/205.24 |
| 5,681,989 A | * | 10/1997 | Kanke et al. ............... | 73/118.2 |

FOREIGN PATENT DOCUMENTS

| | | |
|---|---|---|
| DE | 44 26 102 A1 | 1/1996 |
| EP | 0 459 723 A2 | 12/1991 |
| EP | 0 589 211 A2 | 3/1994 |
| EP | 0 628 715 A2 | 12/1994 |
| EP | 0 657 722 | 6/1995 |
| FR | 2 439 388 | 5/1980 |
| JP | 58-28621 | * 2/1983 ............... 73/204.15 |
| JP | 5312613 | 11/1993 |
| JP | 5-340958 | 12/1993 |

* cited by examiner

*Primary Examiner*—William Oen
(74) *Attorney, Agent, or Firm*—Crowell & Moring LLP

(57) ABSTRACT

The output characteristics of the sensing device or the control quantity of the sensing element can be adjusted by extracting an adjusting terminal in addition to a power source terminal, a ground terminal, an output terminal and the like outside a housing containing and protecting an electronic circuit. Further, by arranging the adjusting terminal inside a connector housing containing terminals such as the power source terminal, the ground terminal, the output terminal and the like, it is possible to prevent contact of foreign objects to the adjusting terminal and to water-proof the terminals for preventing corrosion since an associated connector is attached to the connector when the sensing device is actually used.

27 Claims, 8 Drawing Sheets

CHARACTERISTICS ADJUSTING MEANS OF PHYSICAL QUANTITY SENSING DEVICE AND THERMAL TYPE AIR FLOW MEASURING INSTRUMENT

This application is a continuation of application Ser. No. 09/524,763, filed Mar. 13, 2000 and application Ser. No. 08/900,517, now U.S. Pat. No. 6,070,464, filed Jul. 25, 1997.

BACKGROUND OF THE INVENTION

The present invention relates to a sensing device for detecting various kinds of physical quantities, and more particularly to a sensing device having a function for adjusting output characteristics of the sensing device or a control state of a sensing element.

As a prior art of adjusting output characteristics of a sensing device by applying an electric signal to an adjusting terminal, an acceleration sensor as disclosed in Japanese Patent Application Laid-Open No. 5-340958 is raised. The acceleration sensor has an acceleration detection processing circuit provided with a sensitivity adjusting unit and a zero-point adjusting unit, and an adjusting unit capable of varying a basic output characteristic of sensitivity. The adjusting unit is constructed by combination of a plurality of resistors and switches, and on-off operation of the switch is performed by on-chip trimming from external.

In the prior art described above, the adjusting terminals capable of performing on-off of the adjusting switches are provided on an electronic circuit board, and in a fabrication process of the product there are a filling process of a gel into a housing having the circuit board inside after adjusting the output characteristic and heating processes for bonding a cover and setting the gel and the cover adhesive. Variations of output characteristics in the final products are caused by variations of output characteristics by the process.

Further, in an air flow measuring instrument for an internal combustion engine, in order to make it small in size, light in weight and low in cost, it is preferable that an air flow sensing unit is integrated in a housing containing a circuit board inside and the housing is inserted and mounted so that the sensing device is positioned in an air intake flow passage of the internal combustion engine. Since the adjusting work needs to be performed by actually flowing air through the flow sensing unit, the air flow measuring instrument is mounted on a rig corresponding to the air intake flow passage after almost completing the housing and the flow sensing unit, and adjusting work is performed from the outside of the rig by actually flowing air. A means capable of performing such adjusting work is necessary.

Particularly, in a thermal type air flow measuring instrument, the sensing element can be made small in size and the sensing element needs to be electrically connected to an electronic circuit for controlling the sensing element and outputting. Therefore, it is possible to provide a small-sized and low-cost air flow measuring instrument in which a flow sensing unit is integrated in a housing containing an electronic circuit. However, since the electronic circuit is also placed in the air intake flow passage, adjusting work is performed from the outside of the air intake flow passage when the adjusting work is performed by actually flowing air through the flow sensing unit. A means capable of performing such adjusting work is necessary. Further, in a case where the sensing element is placed in an auxiliary passage from the viewpoint of various kinds of performance and reliability, in taking it into consideration to make the instrument small in size and low in cost, the number of parts is reduced by forming the auxiliary passage in the housing and forming the auxiliary passage by the cover of the housing. However, in taking into consideration the effect of variations in shapes of the auxiliary passage on the output characteristics, it is necessary to perform adjustment by actually flowing air after completion of the auxiliary passage, and a means capable of adjusting from external is further required.

SUMMARY OF THE INVENTION

An object of the present invention is to provide a highly accurate sensing device, the characteristic adjustment of which can be performed in a final process.

Another object of the present invention is to provide a low-cost sensing device in which the sensing elements and the electronic circuit are integrated to reduce the number of the parts, the size and the weight, and it is possible to easily perform the characteristic adjustment of the sensing device.

Another object of the present invention is to provide a sensing device, which is suitable for the environment of actual use, and in which the characteristic adjustment can be performed under a state that the sensing device is set in the environment of actual use.

In the present invention, for example, adjustment of output characteristic can be performed in the final process in production of the devices as products, and occurrence of the variations of the products due to change in the output characteristic in such processes as filling the gel and bonding the cover is suppressed.

In order to solve the above-mentioned problems, in addition to the electric power supply, ground and output terminals which are provided in a common sensing device, an output characteristic adjusting terminal of the sensing device or a control quantity adjusting terminal of a sensing element is provided outside a housing for containing an electronic circuit inside.

Further, in order to prevent problems such as corrosion of the terminals or short-circuit caused by coming in contact with a conductive material under the environment of actual use of the sensing device, the adjusting terminal is covered with adhesive or the like, or the adjusting terminal is arranged inside a connector housing containing the electric power supply, ground and output terminals so that foreign objects are prevented from coming in contacting with the terminals and the connector housing becomes a water-proof place under the environment of actual use in which the associating connector is connected. In that case, by arranging the adjusting terminal at a lower (deeper) level to the depth direction of the connector housing than the level of the power source terminal and so on, it is possible to prevent the power source terminal and so on from coming in contact with another thing, for example, contact with a probe during adjusting work or contact with an associating connector when the associating connector is connected. Further, by arranging the adjusting terminal in a hole provided on the bottom of the connector housing, it is possible to prevent electrical short-circuit during adjusting work more positively.

DESCRIPTION OF PREFERRED EMBODIMENTS

Embodiment of the present invention will be described below, referring to FIG. 1 to FIG. 12. In the present invention, thermal type air flow measuring instruments are shown as typical embodiments. Since the other kinds of physical quantity sensing devices are basically the same as the thermal type air flow measuring instrument only except for in their sensing element and arranging method, the embodiments of the other type will be omitted.

Figure 1:
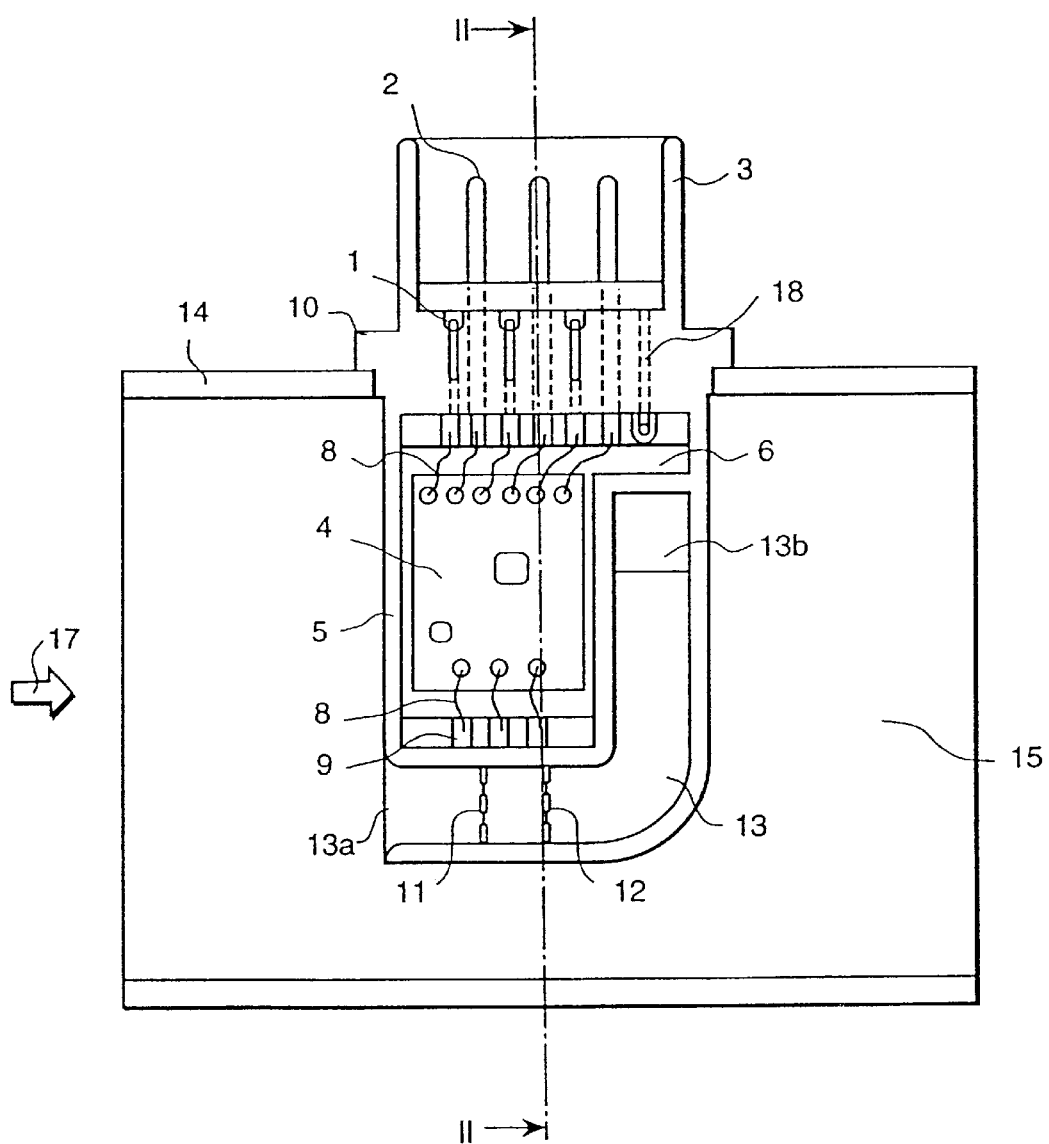
FIG. 1 is a cross-sectional side view showing an embodiment of a sensing device in accordance with the present invention.
Figure 2:
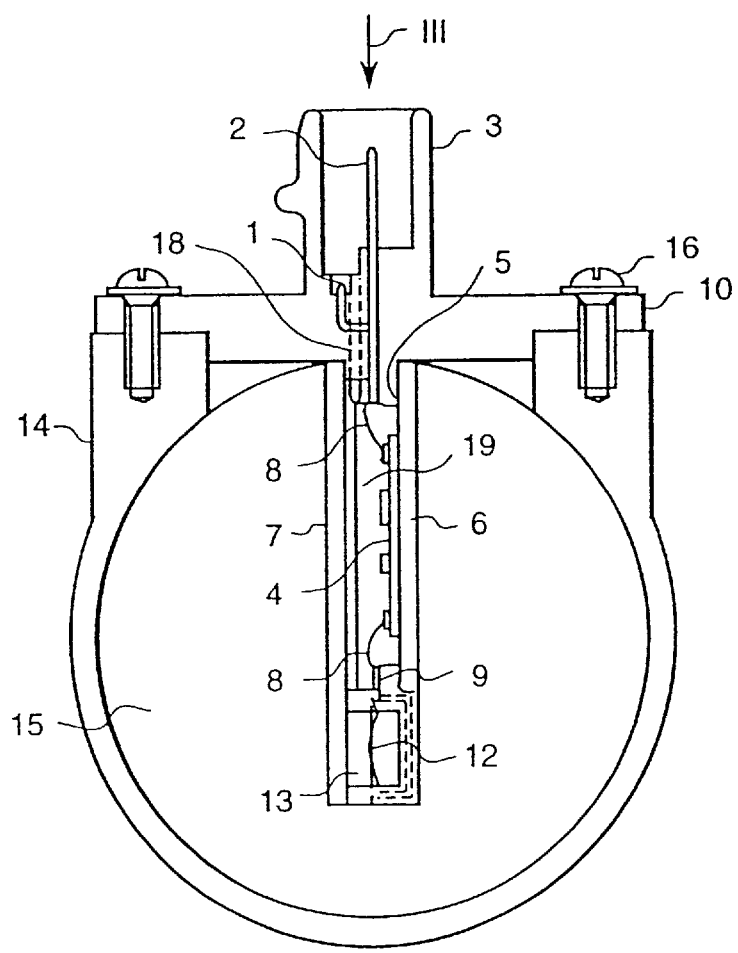
FIG. 2 is a view showing the sensing device being taken on the plane of the line II—II of FIG. 1.
Figure 3:
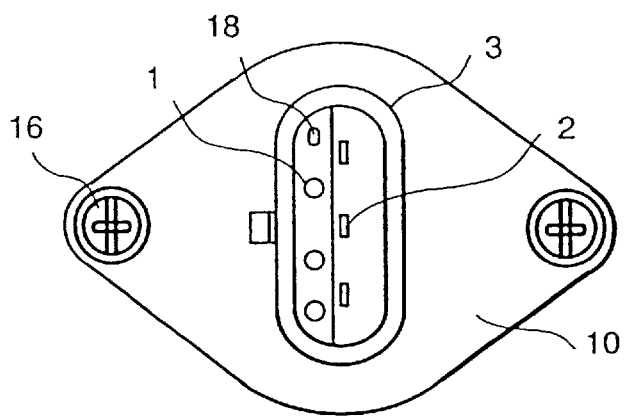
FIG. 3 is an external view showing the sensing device seeing from the arrow III of FIG. 2.

FIG. 1 is a cross-sectional side view showing an embodiment of a thermal type air flow measuring instrument in accordance with the present invention. FIG. 2 is a view of the thermal type air flow measuring instrument being taken on the plane of the line II—II of FIG. 1. FIG. 3 is an external view of the thermal type air flow measuring instrument seeing from the top.

An electronic circuit 4 is bonded and fixed onto a metallic base 6, and surrounded by a housing 5 which is also bonded and fixed to the metallic base 6 or insert-formed in a unit with the metallic base 6.

The housing 5 is a plastic part which is insert-formed with metallic parts of connector terminals 2, adjusting terminals 1 and sensing element terminals 9 (the metallic base 6 may be also insert-formed, as described above). In addition to a function to contain and protect an electronic circuit 4, the housing 5 is integrated in a unit together with an auxiliary passage 13, a connector housing 3, a fixing flange 10 and so on. Therefore, the electronic circuit 4 is contained in a box-shaped body composed of the metallic base 6 as the bottom and the housing 5 as side walls, and the adjusting terminals 1 and the connector terminals 2 penetrate from the inner side of the box-shaped body containing the electronic circuit 4 to the inside portion of the connector housing 3. By connecting the terminal near an inner side end of the housing 5 and the electronic circuit 4 with metallic wires 8, the electronic circuit 4 and the adjusting terminals 1 and the connector terminals 2 inside the connector housing 3 are electrically connected. Similarly, the sensing terminals 9 penetrate from the inner side of the box-shaped body containing the electronic circuit 4 to the auxiliary passage 13. By connecting the terminals near the other end of the inner side of the housing 5 and the electronic circuit 4 with metallic wires 8 and by welding a heating resistor 11 and a temperature compensating resistor 12 to the sensing terminals 9 in a side end portion of the auxiliary passage 13, the heating resistor 11 and the temperature compensating resistor 12 are brought in electrical continuity with the electronic circuit 4. Then, the inside of the box-shaped body containing the electronic circuit 4 is filled with a silicon gel 19, and the electronic circuit 4 is sealed by bonding a cover 7 (actually, the box-shaped body is opened only through a ventilation hole 18 for leaking air remaining inside the housing 5 to the inner side of the connector housing 3 when the air is heated and expanded). Further, the terminals except for the connector terminal 2, the adjusting terminals 1 and the sensing element terminals 9 are electrically insulated. Further, by bonding the cover 7, the auxiliary passage 13 is completed as a passage having an opening upstream of the housing 5 as an inlet 13a and a square hole bored in the housing 5 and the cover 7 as an outlet 13b. The reason why the auxiliary passage 13 is formed in such a complex-shaped passage having a bend as shown in this embodiment is that the structure is effective in preventing the sensing elements from fouling, suppressing air flow disturbance and reducing sensing error due to pulsating flow, and therefore the structure is suitable for intake air sensing of an internal combustion engine. This module is inserted through a hole in an outer wall surface of a body 14 and attached so that the inlet 13a and the outlet 13b of the auxiliary passage 13 are positioned inside the main passage 15, and a fixing flange 10 integrally formed in the housing 5 is fixed onto the body 14 using screws 16. Thus, the structure of the thermal type air flow measuring instrument is completed.

By employing this structure, it is possible to reduce the number of parts and largely reduce the cost. Further, even though the auxiliary passage employs such a complex structure as to have the bend, the housing 5 can be formed easily through plastic forming, and can be very small in size, light in weight, small in the number of parts and low in cost. Furthermore, the thermal type air flow measuring instrument can be inserted and mounted to an existing component of an air intake system such as an air cleaner without setting such a body described above.

Measured air flow rate is the total flow rate of air flowing in the main passage 15 in the body 14 in the main flow direction. The total flow rate is detected based on an amount of heat radiated from the heating resistor 11 arranged inside the auxiliary passage 13 into which part of air flowing in the main passage flows. Therefore, since the measuring accuracy is affected by variations existing among the products such as variations in structures of the heating resistor 11, in shapes of the passage, in elements of the electronic circuit and so on, it is necessary to individually adjusting output characteristics of the products.

In a case where the adjusting terminals are arranged on the electronic circuit or the characteristic adjustment is performed by laser trimming of a resistor or the like as in the prior art, it is impossible to perform the adjustment after completion of the structure of a thermal type air flow measuring instrument as in the present invention. Accordingly, the adjustment cannot help being performed in a state where the electronic circuit 4 is exposed at a time before the cover 7 is bonded. Therefore, since the processes of filling of the silicon gel 19, bonding of the cover and thermo-setting to the box-shaped body of the housing 5 containing the electronic circuit 4 are required after performing adjustment, change in characteristic due to these processes is a factor to cause variations among the products to degrade them. However, in the present invention, since characteristic adjustment can be performed by applying electric signals to the adjusting terminals 1 provided inside the connector housing after completion of the structure, the adjusting work can be performed in the final process and consequently characteristic change after adjusting can be eliminated. Further, since shipping inspection may be eliminated or shipping inspection may be performed in the adjusting process, the inspection process can be easily performed.

Furthermore, in the thermal type air flow measuring instrument, the characteristic adjustment needs to be performed by actually flowing air. Particularly, in this embodiment, it is preferable that the characteristic adjustment is performed with the final construction of the product by flowing air to the main passage 15 under a state in which it is attached to the body 14. Therefore, in the conventional technology, the structure having the electronic circuit 4 inside the body 14, as in this embodiment, has been very difficult to be adjusted by flowing air through the main passage 15. However, according to the present invention, adjustment can be easily performed using the adjusting terminal 1 inside the connector housing 3 arranged outside the body 14, as described above. Further, in the thermal type air flow measuring instrument, in order that an air flow rate can be measured based on an amount of heat radiated from the. heating resistor to the air, the heating resistor 11 is heating-controlled by the electronic circuit 4 so as to keep a constant temperature difference to the temperature compensating resistor 12. Since variations in the amounts of heats among the products occur, adjusting of the electronic circuit 4 is also required. In the present invention, it is also possible to adjust such a control quantity of the sensing element easily, as described above.

In an actual adjusting process, the connector terminal 2 and a line adjusting apparatus need to be electrically connected in order to drive the thermal type air flow measuring instrument to measure its output, and the adjusting terminal 1 and the line adjusting apparatus need to be electrically connected in order to apply an electric signal to the adjusting terminal 1. Since these connections are temporary for only at adjusting work, the adjusting work is usually performed by pressing probes provided in the line adjusting apparatus pressed to the individual terminals. In this embodiment, since all the terminals are arranged inside the connector housing 3, the connection is easily performed by pressing all the probes in the same one direction. However, on the contrary, since there are many terminals in a narrow space, erroneous contact between the terminals and the probes may be caused. Therefore, the adjusting terminal 1 is arranged in a deeper portion of the connector housing 3 so that the power source probe may not reach the adjusting terminal 1, and in addition to this the adjusting terminal 1 is arranged in a hole formed on the bottom surface of the connector housing 3 so that only the probe having a top front diameter smaller than that of the hole can be connected to the adjusting terminal 1. Further, by insulating the outer periphery of the probe for adjusting terminal, it is possible to eliminate electric short-circuiting caused by contact with the connector terminal 2 or the other probes.

In practical use of the thermal type air flow measuring instrument, since the inside of the connector housing is usually water-proofed by connecting an associated connector to the connector terminal 2 and also connecting an associated connector to the connector housing 3, it is possible to prevent problems of corrosion of the adjusting terminal 1 and electrical short-circuiting with the other terminals.

The construction of the electronic circuit in accordance with the present invention will be described below, referring to FIG. 4 to FIG. 6.

Figure 4:
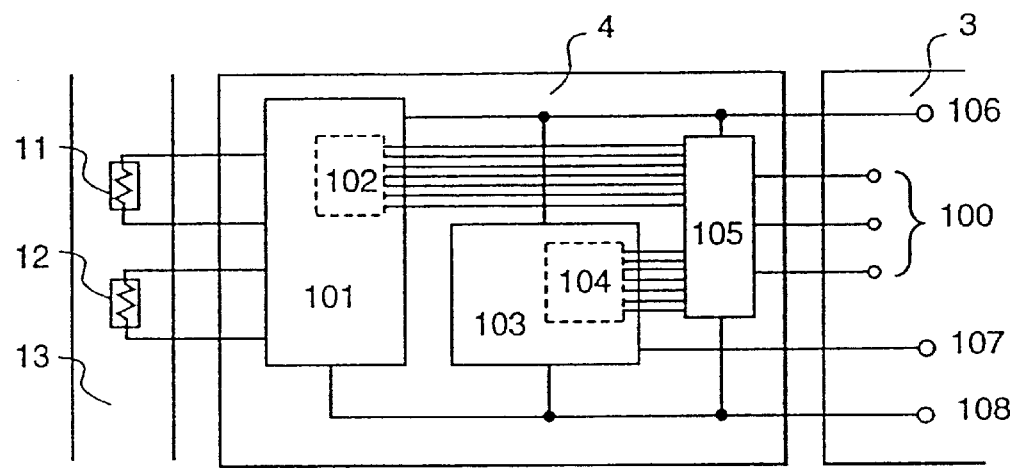
FIG. 4 is a diagram showing the construction of an embodiment of a circuit in accordance with the present invention.

In the embodiment shown in FIG. 4, an transmitting system is switched by an electric signal applied to an adjusting terminal 100 using a multi-plexer 105 to perform adjustment of an output characteristic and an sensing element control quantity using an output characteristic adjusting circuit 104 and a control quantity adjusting circuit 102.

The electronic circuit 4 can be roughly classified into a control circuit 101, an output processing circuit 103 and the multi-plexer 105. The control circuit 101 is electrically connected to the heating resistor 11 and the temperature compensating resistor 12 arranged in the auxiliary passage 13. Further, the control circuit 101 has the control quantity adjusting circuit 102. The output processing circuit 103 is a circuit for converting an electric signal obtained from the control circuit 101 into a predetermined output signal, and has the output characteristic adjusting circuit 104. The power source terminal 106, the output terminal 107 and the ground terminal 108 are arranged in the connector housing 3 and connected to external units.

Figure 5:
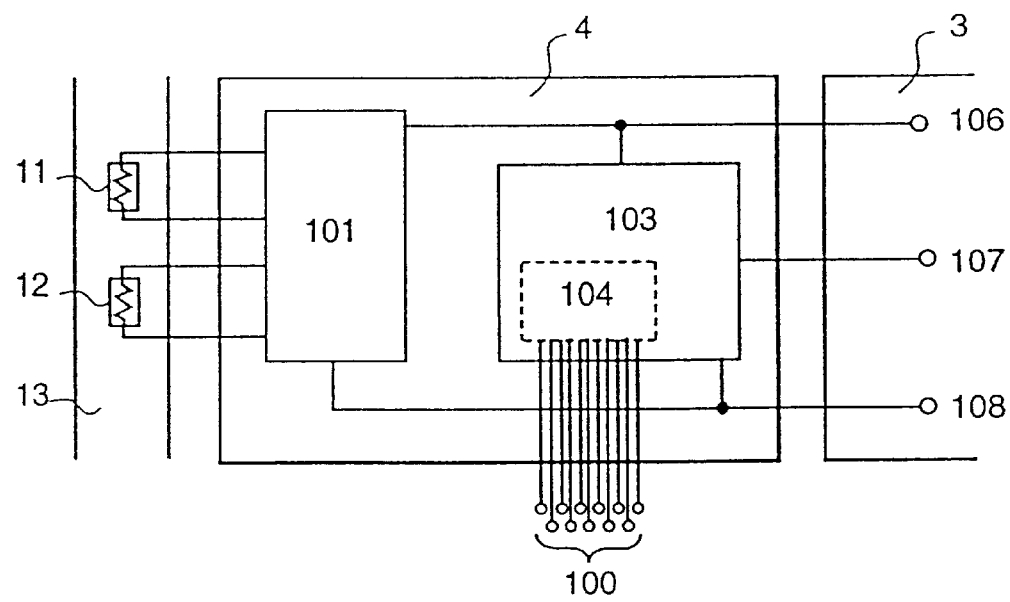
FIG. 5 is a diagram showing the construction of another embodiment of a circuit in accordance with the present invention.

Different from that of FIG. 4, the embodiment of FIG. 5 has no multi-plexer, but can adjust only output characteristic from the outside of the electronic circuit 4.

The electronic circuit 4 can be roughly classified into a control circuit 101 and an output processing circuit 103, and the output processing circuit has a output characteristic adjusting circuit 104. The output characteristic adjusting circuit 104 is a circuit capable of adjusting output characteristic by switching on-off, and the switching on-off can be performed by applying an electric signal to the adjusting terminal 100. The adjusting terminal 100 is extended outside the electronic circuit 4 so that the electric signal can be applied from the outside of the housing containing and protecting the electronic circuit 4.

Figure 6:
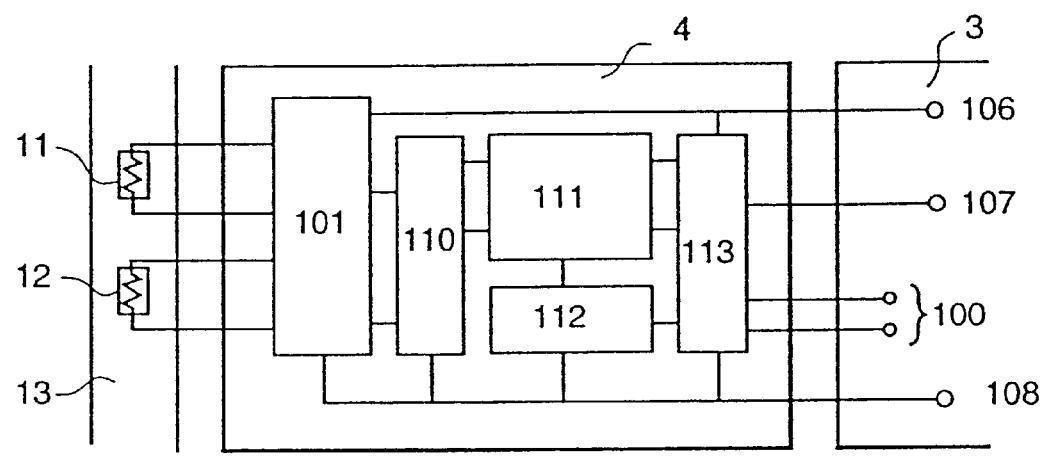
FIG. 6 is a diagram showing the construction of a further embodiment of a circuit in accordance with the present invention.

In the embodiment of FIG. 6, output processing is performed by a microcomputer (CPU) 111. The electronic circuit 4 can be roughly classified into a control circuit 101, an A/D converter 110, the CPU 111, a memory 112 and an interface 113. The control circuit 101 is electrically connected to a heating resistor 11 and a temperature compensating resistor 12 as the same as in the embodiments of FIG. 4 and FIG. 5, and the control may be employ not only analogue control but digital control. The A/D converter 110 converts an electric signal of the control circuit 101 into a digital signal. The CPU 111 performs calculation processing the digital signal based on data stored in the memory 112 to convert the digital signal into an appropriate signal, and the output signal is output as a signal matching to an external unit receiving the signal using the interface circuit 113.

Therefore, in this embodiment, the characteristic adjustment can be performed by storing optimized values in the memory.

When resolution of output characteristic adjustment is increased in the circuit construction described in FIG. 5, number of adjusting terminals is increased. Therefore, it becomes difficult from the viewpoint of space to arrange all the adjusting terminals inside the connector housing as in the embodiments explained by FIG. 1 to FIG. 3. Therefore, description will be made below on an embodiment where the adjusting terminals are arranged outside a connector housing, referring to FIG. 7 and FIG. 8. Since the construction of the thermal type air flow measuring instrument is the same as in the embodiments of FIG. 1 and FIG. 2, description of the instrument will be omitted here.

Figure 7:
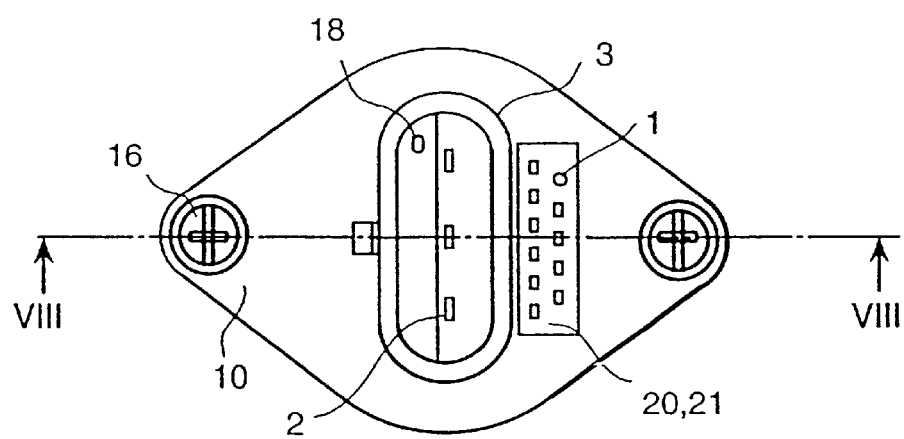
FIG. 7 is an external view showing another embodiment of a sensing device in accordance with the present invention seeing from the arrow III.
Figure 8:
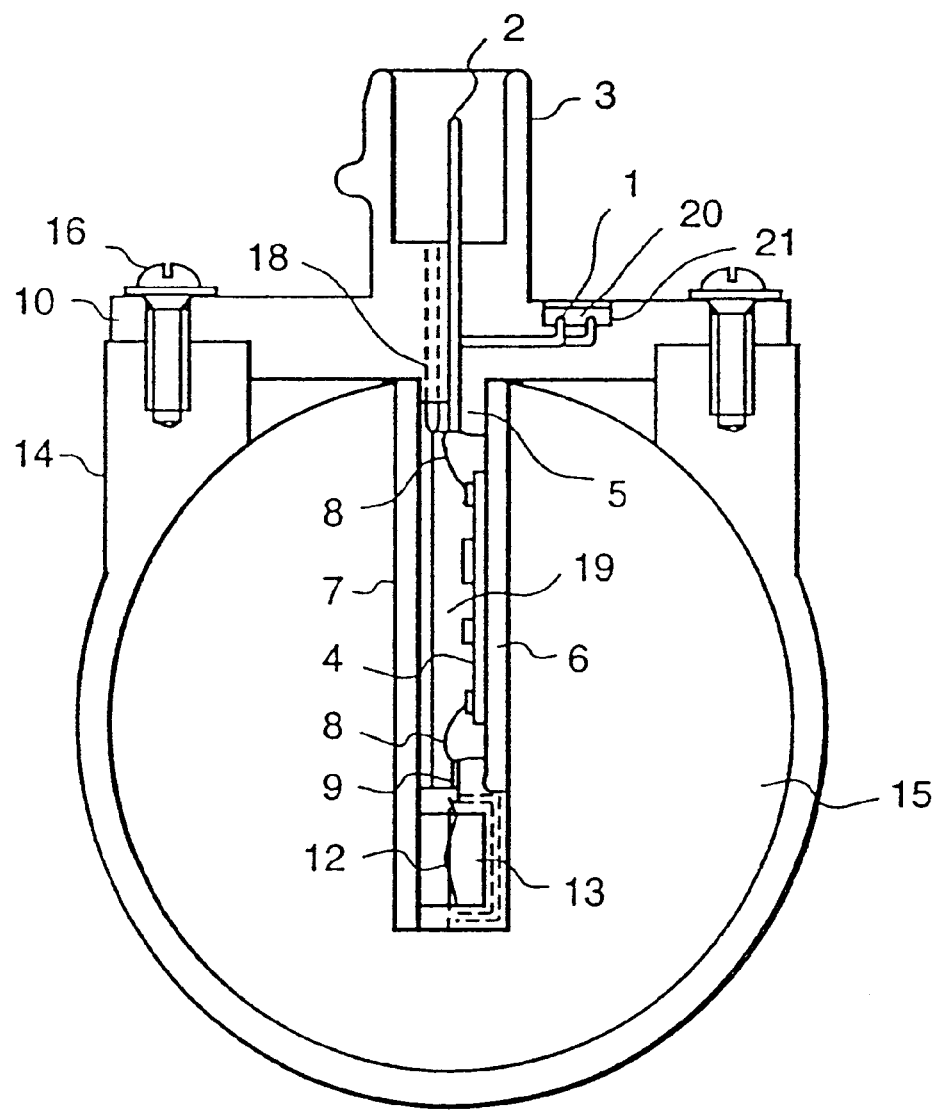
FIG. 8 is a view showing the sensing device being taken on the plane of the line VIII—VIII of FIG. 7.

FIG. 7 is an external view showing the sensing device seeing from the arrow III, and FIG. 8 is a cross-sectional view being taken on the plane of the line VIII—VIII of FIG. 7. Connector terminals 2 are arranged inside a connector housing 3, and adjusting terminals 1 are aligned and arranged in a depressing portion 21 on the upper surface of a fixing flange 10. Therefore, in this embodiment, the characteristic adjustment can be performed after completion of the construction of the thermal type air flow measuring instrument by applying electric signals to the adjusting terminals 1. In a case where the adjusting terminals are arranged in the connector housing, the adjusting terminals 1 are water-proofed and avoided to be in contact with the other parts by attaching the associated connector when it is practically used. However, since the adjusting terminals 1 are arranged outside the connector housing 3 in this embodiment, the adjusting terminals 1 are exposed even when the associated connector is attached. Therefore, by filling the depressing portion 21 with an adhesive 20 to coat the adjusting terminals 1 with the adhesive 20, the adjusting terminals 1 are water-proofed and avoided to be in contact with the other parts. Instead of using the adhesive 20, it may be possible to employ a method that the adjusting terminals are covered with another member, or a method that the adjusting terminals are coated with an insulator.

Description will be made below on an embodiment where a sensing device is set in a portion of which the surrounding is closed, referring to FIG. 9 to FIG. 11.

Figure 9:
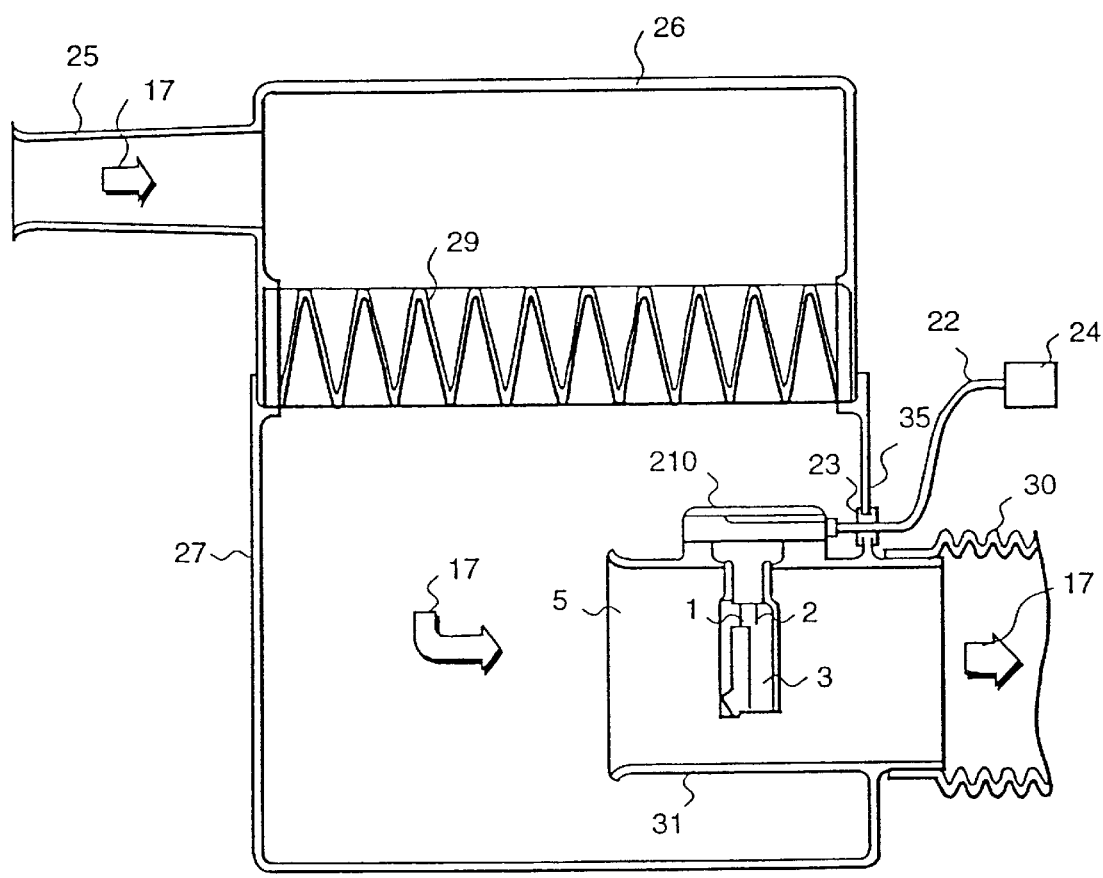
FIG. 9 is a cross-sectional side view showing a further embodiment in accordance with the present invention.
Figure 10:
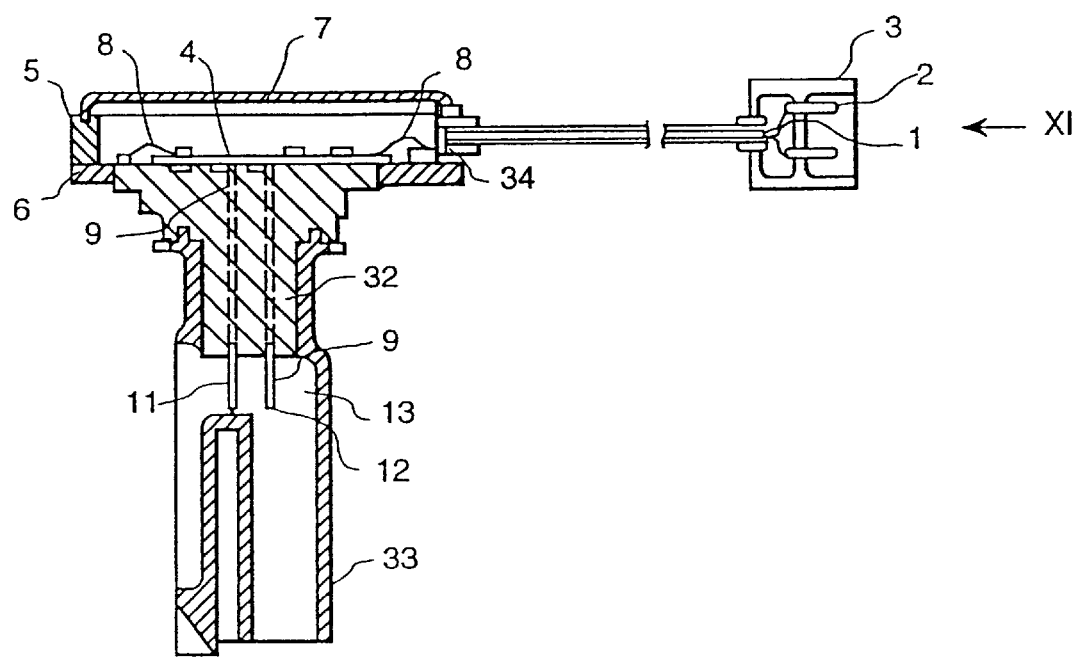
FIG. 10 is a cross-sectional side view showing the sensing device of FIG. 9.
Figure 11:
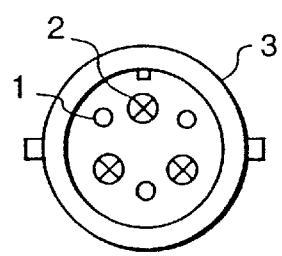
FIG. 11 is an external view showing the sensing device seeing from the arrow XI of FIG. 10.

FIG. 9 is a cross-sectional side view of an air cleaner showing a state where a thermal type air flow measuring instrument is placed inside the air cleaner, and FIG. 10 is a cross-sectional side view showing the thermal type air flow measuring instrument of FIG. 9. FIG. 11 is an external view showing the thermal type air flow measuring instrument of FIG. 10 seeing from the arrow XI.

The thermal type air flow measuring instrument 210 is inserted into an inner duct 31 integrated with an air cleaner clean side housing 27 in a unit so that an inlet 13a and an outlet 13b of an auxiliary passage 13 is positioned in the inner portion of the inner duct 31. An air filter 29 is fixed between the air cleaner clean side housing 27 and an air cleaner dirty side housing 26, and an inlet duct 25 is attached in the air cleaner dirty side housing 26 and a connecting duct 30 is attached downstream of the inner duct 31 of the air cleaner clean side housing 27, and an internal combustion engine is arranged downstream of the connecting duct 30. Therefore, flow of intake air shown by main flow direction 17 flows into the air cleaner dirty side housing 26 from the inlet duct 25, and flows into the inner duct 31 from the air cleaner clean side housing 27 passing through the air filter 29. Here, the inner duct 31 corresponds to the main passage 15 of the thermal type air flow measuring instrument 210, and part of the air lowing through the main passage 15 flows into the auxiliary passage 13 and then into the internal combustion engine through the connecting duct 30.

In the thermal type air flow measuring instrument 210 shown in this embodiment, a holder 32 holding a sensing element terminal 9 is integrated with a metallic base 6 in a unit, and an auxiliary passage structural member 33 is arranged so that a heating resistor 11 and a temperature compensating resistor 12 are positioned inside the auxiliary passage 13. An electronic circuit 4 is fixed on the upper surface of the metallic base 6, and a housing 5 is also fixed on the upper surface of the metallic base 6 so as to contain the electronic circuit 4. The electronic circuit 4 and the sensing element terminal 8 and a lead frame 34 are electrically connected with a metallic wire 8, and the lead frame 34 is extended outside the housing 5 to be connected to a wire-harness 22, and a connector 24 is arranged in the opposite end portion of the wire-harness 22. The connector 24 is composed of a connector housing 3 containing connector terminals 2 and adjusting terminals 1, and the connector terminals 2 and the adjusting terminals 1 are electrically connected to the electronic circuit 4 through the wire-harness 22, the lead frame 34 and the metallic wires 8. Therefore, as the same as in the above-mentioned embodiment, the characteristic adjustment can be performed by applying an electric signal to the adjusting terminal 1 after fixing the cover 7 onto the housing 5 and the electronic circuit 4 is completely covered.

Further, in this embodiment, although the thermal type air flow measuring instrument 210 is fixed to the inner duct 31 and placed in the air cleaner 200 having the air filter 29 and the air cleaner dirty side housing 26, the connector 24 is led out in the outside of the air cleaner 200. On the other hand, a connector extracting hole 35 of the air cleaner clean side housing 27 is sealed by a rubber boot 23 provided in the middle of the wire-harness 22. Therefore, according to this embodiment, even after the sensing device, that is, the thermal type air flow measuring instrument 210 is set in an enclosed place of use, that is, the inside of the air cleaner 200 in this case, the characteristic adjustment can be performed by applying an electric signal to the adjusting terminal 1 of the connector 24 extracted outside. Further, the characteristic adjustment can be performed under a state of actual use, that is, after it is installed in the air cleaner 200 in this case.

Figure 12:
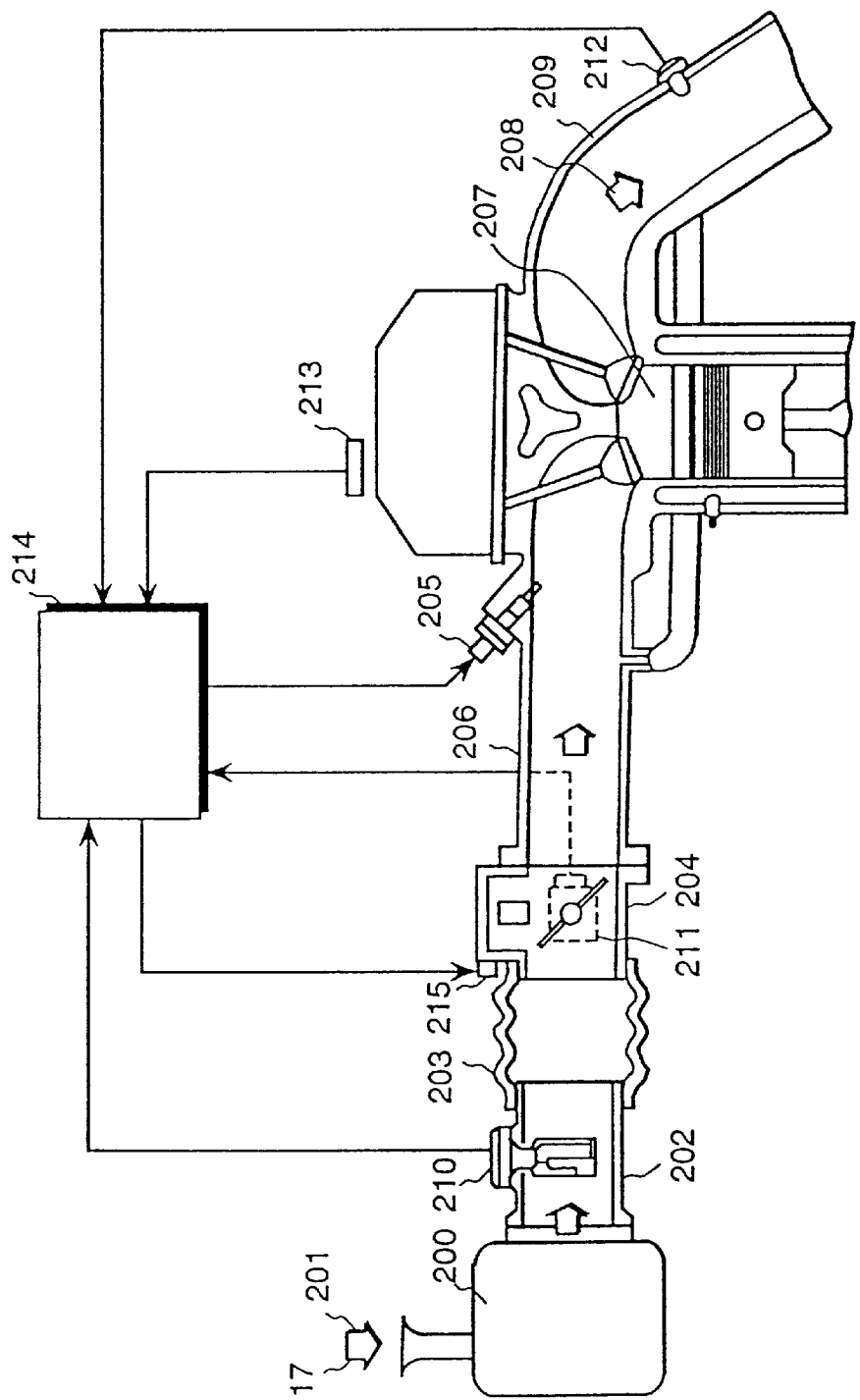
FIG. 12 is a view showing an embodiment of a control system in which the present invention is used.

Finally, description will be made below on an embodiment of an internal combustion engine of electronic control fuel injection type which a thermal type air flow measuring instrument in accordance with the present invention is applied to, referring to FIG. 12.

Intake air 201 entering from an air cleaner 200 is sucked into an engine cylinder 207 though a body 202 of a thermal type air flow measuring instrument, a duct 203 and an intake manifold 206 having a throttle body 204 and an injector 205 for fuel supply. On the other hand, exhaust gas 208 produced in the engine cylinder 207 is exhausted through an exhaust manifold 209.

An air flow signal output from an electronic circuit of the thermal type air flow measuring instrument 210, a throttle valve opening signal output from a throttle angle sensor 211, an oxygen concentration signal output from an oxygen sensor 212 provided in the exhaust manifold 209 and a rotating speed signal output from an engine rotating speed sensor 213 are input to a control unit 214, and the control unit 214 outputs signals such as an idle control valve opening and so on under an optimum fuel injection rate obtained by calculation processing to control the injector 205 and the idle air control valve 215.

According to the present invention, a highly accurate sensing device can be provided since the characteristic adjustment of the sensing device can be performed in the last process and accordingly it is possible to prevent change in the characteristics produced in the processes after the adjustment such as gel filling, cover bonding, thermo-fitting processes in the conventional sensing device. Further, a low-cost sensing device can be provided since the sensing elements and the electronic circuit are integrated to reduce number of the parts, the size and the weight, and it is possible to easily perform the characteristic adjustment of the sensing device. Furthermore, a sensing device suitable for the environment of actual use can be provided since the characteristic adjustment can be performed under a state that the sensing device is set in the environment of actual use.

What is claimed is:

1. A physical quantity detecting device, comprising:
   a detecting element for detecting a physical quantity;
   an electric circuit processing a signal from said detecting element and outputting a signal through an output terminal;
   an input terminal inputting an adjusting signal for adjusting said electric circuit;
   a housing containing said electric circuit; and
   a wall protruding outwards from said housing and surrounding said output terminal, said input terminal being located in a hole provided in said housing.

2. A physical quantity detecting device according to claim 1, wherein said wall is provided with an opening portion in an extension directed to said output terminal or said input terminal.

3. A physical quantity detecting device according to claim 1, wherein said output terminal and said input terminal have different heights.

4. A physical quantity detecting device, comprising:
   a detecting element for detecting a physical quantity;
   an electric circuit controlling said detecting element and outputting a signal in response to said control through an output terminal;
   an input terminal inputting an adjusting signal for adjusting said electric circuit;
   a housing containing said electric circuit; and
   a wall protruding outwards from said housing and surrounding said output terminal, said input terminal being located in a hole provided in said housing.

5. A physical quantity detecting device according to claim 4, wherein said wall is provided with an opening portion in an extension direction of said output terminal or said input terminal.

6. A physical quantity detecting device according to claim 1, wherein said output terminal and said input terminal have different heights.

7. A physical quantity detecting device, comprising:
   a detecting element for detecting a physical quantity;
   an electric circuit electrically connected to said detecting element, processing a signal from said detecting element and outputting a signal through an output terminal, said output terminal being connected to an external unit when detecting a physical quantity;
   an input terminal electrically connected to said electric circuit and inputting an adjusting signal for adjusting said electric circuit, said input terminal being connected to an external unit when adjusting said electric circuit;
   a housing enclosing therein said electric circuit; and
   a wall disposed outside said housing, extending from one end thereof at said housing to another end opposite to said one end and surrounding said output terminal, said input terminal being located in a hole provided in said housing.

8. A physical quantity detecting device according to claim 7, wherein said wall is provided with an opening at said other end thereof opposite to said housing.

9. A physical quantity detecting device according to claim 7, wherein said output terminal and said input terminal surrounded by said wall have different lengths.

10. A physical quantity detecting device, comprising:
    a detecting element for detecting a physical quantity;
    an electric circuit electrically connected to said detecting element, controlling said detecting element and outputting a signal in response to said control through an output terminal, said output terminal being connected to an external unit when detecting a physical quantity;
    an input terminal electrically connected to said electrical circuit and inputting an adjusting signal for adjusting said electric circuit, said input terminal being connected to an external unit when adjusting said electric circuit;
    a housing enclosing therein said electric circuit; and
    a wall disposed outside said housing, extending from one end thereof at a side of said housing to another end opposite to said one end and surrounding said output terminal and said input terminal, said input terminal being located in a hole provided in said housing.

11. A physical quantity detecting device according to claim 10, wherein said wall is opened at said other end thereof opposite to said housing.

12. A physical quantity detecting device according to claim 10, wherein portions of said output terminal and said input terminal surrounded by said wall have different lengths.

13. A physical quantity detecting device, comprising:
    a detecting element for detecting a physical quantity;
    an electric circuit electrically connected to said detecting element, processing a signal from said detecting element and outputting a signal through an output terminal, said output terminal being connected to an external unit when detecting a physical quantity;
    an input terminal electrically connected to said electric circuit and inputting an adjusting signal for adjusting said electric circuit, said input terminal being connected to an external unit when adjusting said electric circuit; and
    a connector provided with a power supply terminal and/or a ground terminal of said electronic circuit,
    wherein said input terminal is provided inside said connector, said input terminal being located in a hole provided in said connector.

14. A physical quantity detecting device according to claim 13, wherein said connector has a wall extending from one end to another end opposite to said one end and surrounding said power supply terminal and/or said ground terminal and said input terminal, said power supply terminal and/or said ground terminal extend from said one end of said connector toward said another end, and said another end being open.

15. A physical quantity detecting device according to claim 13, wherein said power supply terminal and/or said ground terminal and said input terminal inside said wall are different length.

16. A physical quantity detecting device according to claim 13, wherein an output terminal outputting a signal processed by said electronic circuit is further provided in said connector.

17. A physical quantity detecting device, comprising:
    a detecting element for detecting a physical quantity;
    an electric circuit electrically connected to said detecting element, controlling said detecting element and outputting a signal corresponding to a controlled quantity;
    an input terminal electrically connected to said electric circuit and inputting an adjusting signal for adjusting said electric circuit, said input terminal being connected to an external unit when adjusting said electric circuit; and a connector provided with a power supply terminal and/or a ground terminal of said electronic circuit, wherein said input terminal is provided inside said connector, said input terminal being located in a hole provided in said connector.

18. A physical quantity detecting device according to claim 17, wherein said connector has a wall extending from one end to another end opposite to said one end and surrounding said power supply terminal and/or said ground terminal and said input terminal, and said connector is opened in an extension direction of said power supply terminal and/or said ground terminal extending from said one end of said connector toward said another end.

19. A physical quantity detecting device according to claim 17, wherein said power supply terminal and/or said ground terminal and said input terminal in said connector are different in length.

20. A physical quantity detecting device according to claim 17, wherein an output terminal outputting a signal processed by said electronic circuit is further provided in said connector.

21. A physical quantity sensing device comprising:

a sensing element for detecting a physical quantity and an electronic circuit electrically connected to said sensing element for processing said detected physical quantity and outputting an output signal corresponding to said physical quantity;

an adjusting terminal and a connector terminal, wherein via the adjusting terminal output characteristics of the physical quantity sensing device are adjusted and the connector terminal is adapted to transmit said output signal to an external device, and;

an adjusting circuit provided in the electronic circuit for performing adjustment of output characteristics of the physical quantity sensing device, wherein the adjusting circuit is electrically connected to the adjusting terminal, characterized in that the connector terminal and the adjusting terminal are provided inside a connector housing being provided outside of a housing in which the electronic circuit is provided, said adjusting terminal being located in a hole provided on the bottom of the connector housing.

22. A device according to claim 21, wherein the adjusting circuit includes at least one of an output characteristic adjusting circuit and a control quantity adjusting circuit.

23. A device according to claim 21, wherein the connector terminal includes a power source terminal and an output terminal and a ground terminal.

24. A device according to claim 21, wherein the housing surrounding the circuit unit is integrated in a unit together with an auxiliary passage, the connector housing and a fixing flange.

25. A device according to claim 21, wherein the adjusting terminal is located with a larger distance to the opening end of the connector housing than the connector terminal.

26. A device according to claim 21, wherein said physical quantity is an air flow and said device is a thermal type air flow meter.

27. A physical quantity detecting device, comprising:

a detecting element for detecting a physical quantity;

an electrical circuit processing a signal from said detecting element and outputting a signal through an output terminal; and an input terminal inputting an adjusting signal for adjusting said electric circuit, wherein said input terminal is isolated from an external material by a covering or coating material or adhesive after adjusting said electric circuit.

* * * * *